DIVERSITY RECEIVING SYSTEM WITH A VOLTAGE CONTROLLED OSCILLATOR COUPLED TO A CRYSTAL CONTROLLED OSCILLATOR IN AT LEAST ONE CHANNEL

Filed April 28, 1966

INVENTOR.
HEYWARD A. FRENCH
BY Alfred C. Hill
AGENT

DIVERSITY RECEIVING SYSTEM WITH A VOLTAGE CONTROLLED OSCILLATOR COUPLED TO A CRYSTAL CONTROLLED OSCILLATOR IN AT LEAST ONE CHANNEL

Filed April 28, 1966

INVENTOR.
HEYWARD A. FRENCH
BY Alfred C. Hill
AGENT 3,444,471
Patented May 13, 1969

3,444,471

DIVERSITY RECEIVING SYSTEM WITH A VOLTAGE CONTROLLED OSCILLATOR COUPLED TO A CRYSTAL CONTROLLED OSCILLATOR IN AT LEAST ONE CHANNEL

Heyward A. French, Ridgewood, N.J., assignor to International Telephone and Telegraph Corporation, a corporation of Delaware Filed Apr. 28, 1966, Ser. No. 545,982
Int. Cl. H04b *1/06*
U.S. Cl. 325—304 10 Claims

ABSTRACT OF THE DISCLOSURE

A diversity receiver of the predetection combining type which includes: a voltage controlled oscillator coupled to the output of a crystal controlled oscillator in at least one of the channels of the receiver; a phase control means responsive to the signals in the channels of the diversity receiver to control the crystal controlled oscillators and the voltage controlled oscillators to vary the phase relation of said signals and a means to combine said signals.

This invention relates to diversity receiving systems and more particularly to diversity receiving systems of the predetection combining type.

The advantages of diversity to overcome fading is well known in the art and may take the form of space diversity, frequency diversity, time diversity, or angular diversity.

Predetection type combining receiving systems have achieved a known status in the prior art and basically employ a phase comparator to provide a control signal proportional to the phase difference between the separate diversity signals, or between a diversity signal and the combined sum of the separate diversity signals, with this control signal being utilized to control at least one of the local oscillator signal sources associated with one of the diversity receiver channels to cause phase adjustment of the local oscillator signal to vary the phase relationship of the intermediate frequency signals with respect to each other to maintain these intermediate frequency signals in a predetermined phase relationship for substantially inphase combining.

In one form of this prior art predetection combining diversity system, it has been the practice to utilize a crystal controlled oscillator as the controlled local oscillator signal source. It has been found, however, that such a crystal controlled local oscillator with a free running stability of 1 to $10^5$ or 1 to $10^6$ can only be "pulled" in frequency a few hundred cycles. For instance, the local oscillator tuned frequency "pull" range may only be in the order of plus or minus 20 kc. (kilocycles). This relatively limited "pull" range limits the phase lock range for the predetection diversity combiner. Such an arrangement is barely adequate for proper phase control of predetection combined tropospheric scatter signals where the signals to be combined may exceed the frequency "pull" range of the oscillator and thus prevents the desired phase control of signals to be combined resulting in an in operative predetection diversity combining receiving system.

Another undesirable characteristic of this type of prior art phase control arrangement for predetection combining is that the phase correction and lock range of the crystal controlled oscillator is reduced by any frequency drift of the received diversity signals. This reduction of lock range is brought about by the fact that the automatic phase control loop must also perform the function of an automatic frequency control loop.

An object of this invention is to provide a diversity receiving system overcoming the disadvantages of the prior art diversity receiving system mentioned hereinabove.

Another object of this invention is the provision of a diversity receiving system having an improved and extended frequency "pull" range to thereby enable the phase adjustment of diversity signals differing in phase by an amount greater than the frequency "pull" range of the crystal oscillator of the prior art diversity receiving system can correct for.

A feature of this invention is the provision of a diversity receiving system wherein at least one of a plurality of diversity signal channels includes a source of local oscillator signal provided by a crystal controlled oscillator and a voltage controlled oscillator coupled to the output of the crystal controlled oscillator to provide the local oscillator signal, a phase control means responsive to the intermediate frequency signals of the diversity signal channels to control the crystal controlled oscillator and the voltage controlled oscillator for phase adjustment of the local oscillator signal of the one source of local oscillator signal to vary the phase relation of the intermediate frequency signals with respect to each other to maintain the intermediate frequency signals in a predetermined phase relationship, and means to combine substantially inphase the intermediate frequency signals.

Another feature of this invention includes a source of local oscillator signal in each of the diversity signal channels of a pair of diversity signal channels having a crystal controlled oscillator and a voltage controlled oscillator to provide the local oscillator signal for the associated channel. The phase control means, in the form of a phase comparator, produces a phase control signal proportional to the phase difference between the intermediate frequency signals of the two channels with the thusly produced control signal being coupled in a push pull manner to the crystal controlled oscillator and voltage controlled oscillator of each of the sources of local oscillator signal.

Still another feature of this invention includes a source of local oscillator signal associated with each channel including a crystal controlled oscillator and a voltage controlled oscillator and a phase comparator associated with each of the diversity signal channels having one input coupled to the associated signal channel and the other input coupled to the output of the means for combining the intermediate frequency signals. The phase comparators will then produce a control signal proportional to the phase difference between its associated intermediate frequency signal and the combined intermediate frequency signals with the output of each of the phase comparators being coupled to the associated ones of the crystal controlled oscillator and voltage controlled oscillator to adjust the phase of the intermediate signals for inphase combining.

The above mentioned and other features and objects of this invention will become more apparent by reference to the following description taken in conjunction with the accompanying drawings, in which.

Figure 1:
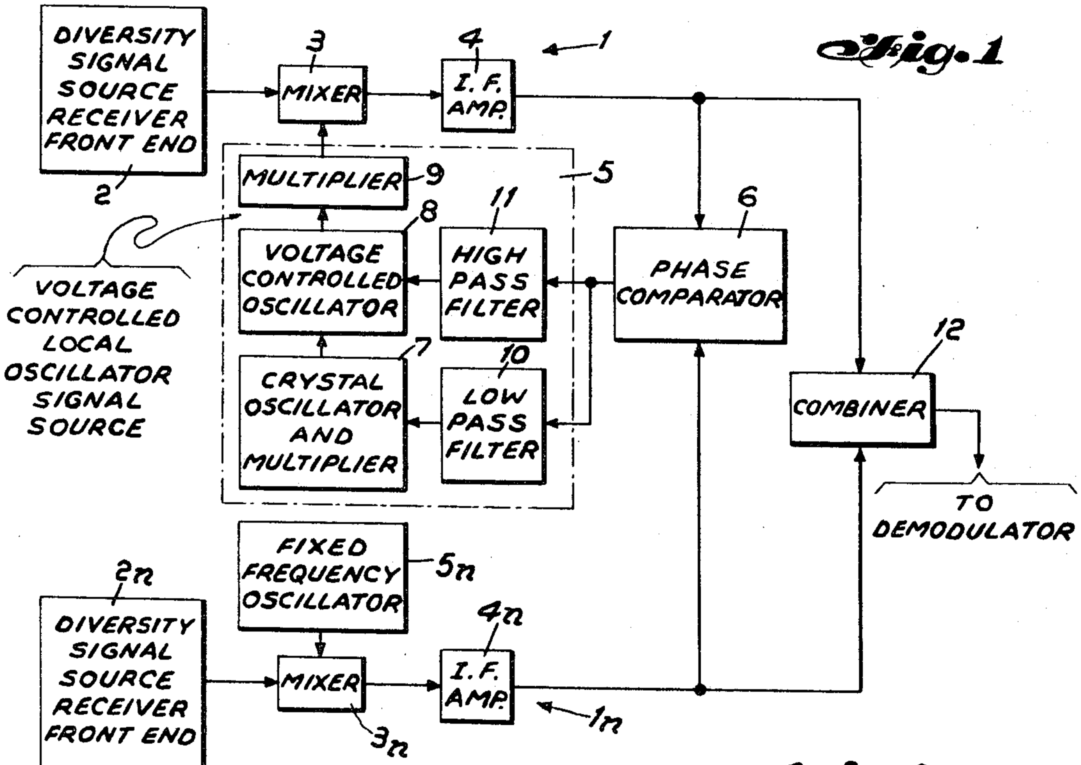
FIG. 1 is a block diagram of one embodiment of a predetection diversity receiving system following the principles of this invention.

Referring to FIG. 1, the diversity receiving system of this invention is illustrated as including diversity signal channel 1 and diversity signal channel 1*n*, each of which include diversity signal source 2 in the form of the receiver front end, mixer 3 and intermediate frequency (IF) amplifier 4. Mixers 3 are coupled to sources 5 of local oscillator signal to produce from the diversity signals received from sources 2 intermediate frequency signals having identical frequencies. Sources 2 will be compatible with the type of diversity technique being employed and the local oscillator signal sources 5 will have their center frequency appropriately adjusted to be compatible with the diversity technique employed to assure the same center frequency for the IF signal output of mixers 3.

The output of channels 1 and 1*n* are coupled to a phase control means which operates upon at least one of the sources of local oscillator signal 5 and 5*n*. More specifically, the phase control means is illustrated as including phase comparator 6 for producing a control signal output which is proportional to the phase relationship between the IF signals at the output of amplifiers 4 and 4*n*. Source 5 of local oscillator signal is illustrated as including a crystal controlled oscillator and associated multipliers 7 coupled in tandem to a voltage controlled oscillator 8 whose output is coupled through appropriate multiplier system 9 to provide the local oscillator signal for mixer 3.

In the illustration of FIG. 1 the local oscillator signal source 5*n* is considered to be provided by a fixed frequency oscillator multiplier chain.

The control signal from phase comparator 6 is coupled through low pass filter 10 to the crystal controlled oscillator 7 and through high pass filter 11 to the voltage control oscillator 8. Crystal controlled oscillator 7 operating at low power injection synchronizes a free running high frequency voltage controlled oscillator 8. The phase control signal drives or adjusts the frequency, and, hence, the phase, of both crystal oscillator 7 and voltage controlled oscillator 8 through low pass filters 10 and 11, respectively. Low pass filter 10 has the purpose of passing only the low frequency variations of the current signal from comparator 6 to "pull" the frequency of crystal oscillator 7 while high pass filter 11 passes the high frequency variations of the control signal from phase comparator 6 to effectively phase modulate voltage controlled oscillator 8. Under these conditions, voltage controlled oscillator 8 will be held to the stable crystal oscillator frequency with the approximate accuracy of the crystal, and voltage controlled oscillator 8 will be phase modulated by the control signal while it is in the process of adjusting and locking the phase of two IF signals of channels 1 and 1*n* to the desired phase relationship.

Figures 2, 4:
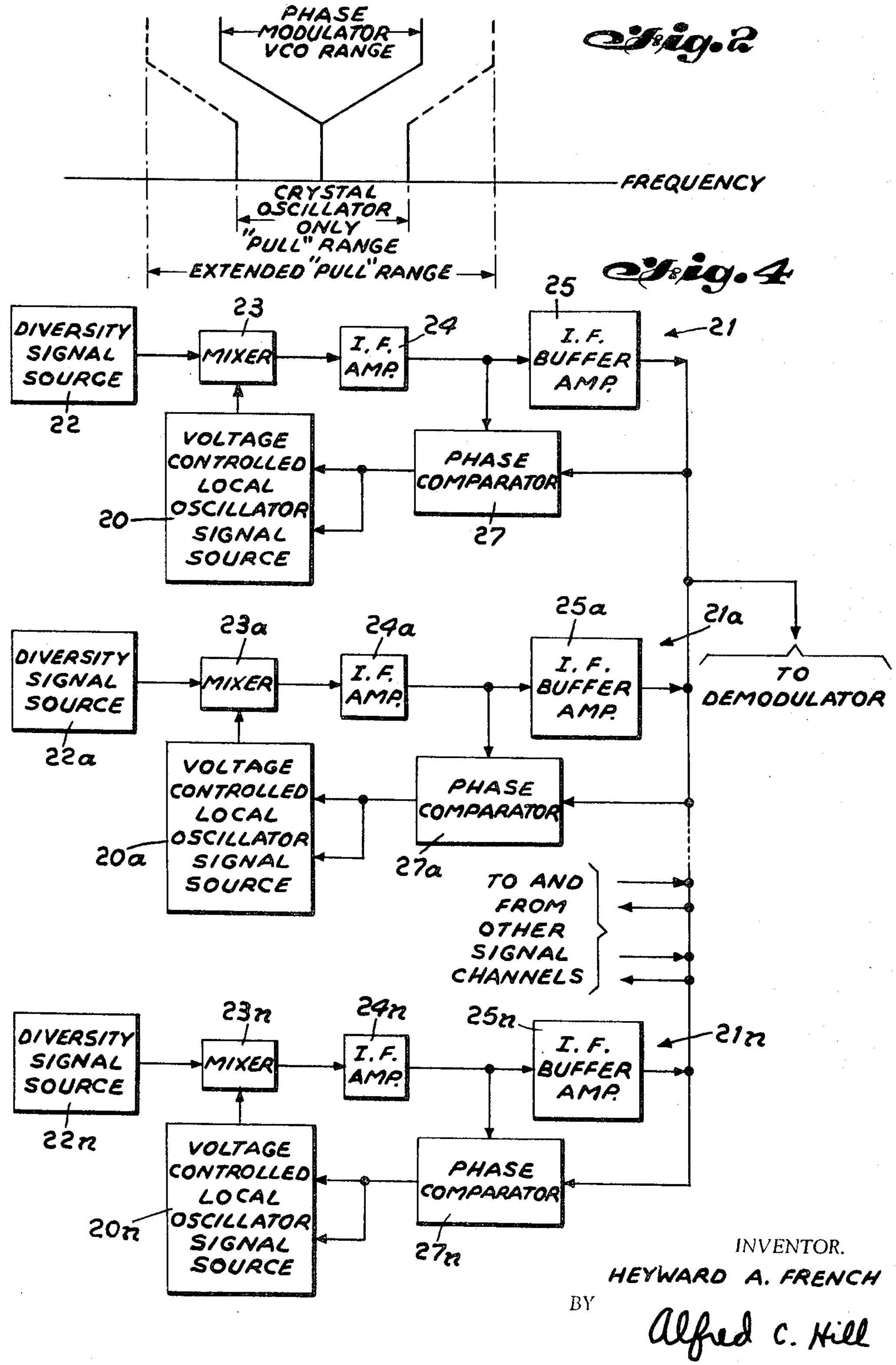
FIG. 2 is an illustration demonstrating the improved "pull" range achieved in accordance with the principles of this invention.
FIG. 4 is a block diagram of still another embodiment of a diversity receiving system in accordance with the principles of this invention.

As illustrated in FIG. 2, the total excursion of "pull" range for the receiver, that is the separation of the diversity signals which can be acted upon by local oscillator 5 and phase comparator 6 to bring about the desired phase relationship will be increased above the normal crystal oscillator "pull" range, if it were used alone, by the extent that the voltage controlled oscillator 8 is phase modulated by the control signal. The resultant local oscillator signal will, thus, be phase modulated by the control signal from comparator 6 which is the desired operation for tropospheric scatter signal predetection combining or general received signal predetection combining.

Once the phase lock has been obtained the output of amplifiers 4 and 4*n* are coupled to combiner 12 which combines the two signals inphase for application to the detection portion of the receiver. Phase comparator 6 and combiner 12 must be designed to be compatible one with the other. For instance, if combiner 12 is formed as a resistive combiner, an inphase condition of the IF signals at the output of amplifiers 4 and 4*n* must produce a zero output control signal from comparator 6. On the other hand, where combiner 12 is of the type that requires a 90° phase relationship between the two signals being combined for inphase combining, phase comparator 6 must be such that a 90° phase relationship between the IF signals from the amplifiers 4 and 4*n* will produce a zero control voltage output.

Figure 3:
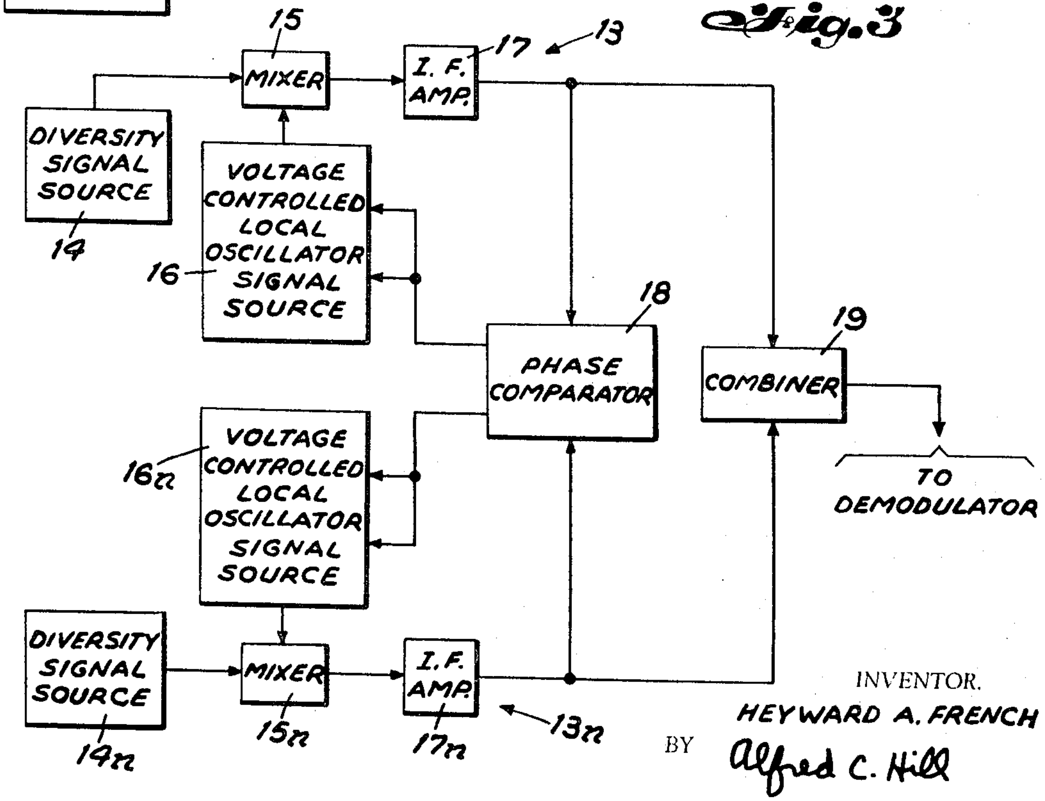
FIG. 3 is a block diagram of still another embodiment of a diversity receiving system in accordance with the principles of this invention.

Referring to FIG. 3, there is illustrated a diversity receiving system similar to the arrangement of FIG. 1 including diversity signal channels 13, each of which include a diversity signal source 14, mixer 15, source of local oscillator 16, and IF amplifier 17. Each of the local oscillator signal sources 16 and 16*n* will include a crystal controlled oscillator and voltage controlled oscillator in the configuration illustrated for local oscillator signal source 5 of FIG. 1.

The difference between the system of FIG. 1 and the system of FIG. 3 is that the phase comparator 18 produces two control signals in a push pull relationship with each of these control signals being coupled to the voltage controlled oscillator and crystalled control oscillator of sources 16 and 16*n* in the manner illustrated in source 5 of FIG. 1. If the control voltage coupled to source 16 is plus, the control to 16*n* is minus and this arrangement enables a reduction by one-half of the "pull" range of both the local oscillator signals to bring about the desired phase relationship between the IF signal outputs of amplifiers 17 and 17*n* for combining in combiner 19.

The arrangement of FIG. 3 has the same advantage as the arrangement of FIG. 1 with respect to the control of a voltage controlled oscillator and crystal controlled oscillator and in addition has the advantage achieved by the push pull control signal arrangement described with respect to FIG. 3.

The arrangements of FIGS. 1 and 3 are used with dual diversity receiving systems and may be employed in four fold diversity receiving systems where each of the two pairs of diversity signals are compared controlled and combined, with the output of each pair being further compared and controlled by controlling the local oscillator signal source of the two pairs of diversity signals, and combined in accordance with the principles of this invention as described with respect to FIGS. 1 and 3 to produce the final resultant combined signal.

Referring to FIG. 4, there is still another diversity receiving system illustrated utilizing local oscillator signals sources 20 which are configured like local oscillator signal source 5 of FIG. 1, that is each of sources 20 include a voltage controlled oscillator and a crystal controlled oscillator for control by the appropriate phase control signal. The arrangement of FIG. 4 is particularly advantageous with an n-fold diversity system wherein any number of diversity signal channels 21 are associated with their appropriate local oscillator signal sources 20. Each of the signal channels include, as before, diversity signal source 22, mixer 23, IF amplifier 24 and IF buffer amplifier 25. The output of buffer amplifiers 25 are coupled to common conductor 26 upon which the IF signals are combined inphase. The purpose of the buffer amplifiers is to isolate the individual channel signals to the phase comparators 27 from the resultant combined output on conductor 26.

Phase comparators 27 are connected as illustrated to compare the phase of the IF signal of its associated channel with the combined IF signal on output conductor 26 and produce a control signal proportional to the phase relationship between these two signals. The control signals of comparators 27 are coupled to their associated local oscillator signal sources 20 for the dual control of the crystal oscillator and voltage controlled oscillator to provide the advantage in accordance with the principles of this invention, namely, the extension of the "pull" range of the receiver to enable the phase adjustment of signals that would normally be outside the normal "pull" range of the crystal oscillator alone.

While I have described above the principles of my invention in connection with specific apparatus it is to be clearly understood that this description is made only by way of example and not as a limitation to the scope of my invention as set forth in the objects thereof and in the accompanying claims.

I claim:

1. A diversity receiving system comprising:
a plurality of diversity signal channels;
each of said channels including
a source of local oscillator signal to produce an intermediate frequency signal at the output of said channel, the intermediate frequency signals at the output of each of said channels having the same frequency;
at least one of said sources including
a crystal controlled oscillator, and
a voltage controlled oscillator coupled to the output of said crystal controlled oscillator to provide said local oscillator signal;
phase control means coupled to each of said channels, said crystal controlled oscillator and said voltage controlled oscillator responsive to said intermediate frequency signals to control said crystal controlled oscillator and said voltage controlled oscillator for phase adjustment of said local oscillator signal of said one of said sources to vary the phase relation of said intermediate frequency signals with respect to each other to maintain said intermediate frequency signals in a predetermined phase relationship; and
means coupled to the output of each of said channels to combine substantially inphase said intermediate frequency signals.

2. A system according to claim 1, where
said channels include
at least a pair of said channels; and
said phase control means includes
a phase comparison means coupled to the output of each of said pair of said channels.

3. A system according to claim 2, wherein
said source included in one channel of said pair of channels includes
a fixed frequency oscillator;
said source included in the other channel of said pair of channels includes
said crystal controlled oscillator, and
said voltage controlled oscillator; and
said phase control means includes
said phase comparison means responsive to said intermediate frequency signals at the output of each of said pair of said channels to produce a control signal proportional to the phase relationship between said intermediate frequency signals, and
first means coupled to said phase comparison means to couple said control signal to said crystal controlled oscillator and said voltage controlled oscillator for phase adjustment of said local oscillator signal of said source included in said other channel of said pair of channels to vary the phase relation of said intermediate frequency signal of said other channel of said pair of channels to maintain said intermediate frequency signals of said pair of channels in a predetermined phase relationship.

4. A system according to claim 3, wherein
said first means includes
low pass filter means to couple said control signal to said crystal controlled oscillator, and
high pass filter means to couple said control signal to said voltage controlled oscillator.

5. A system according to claim 2, wherein
said source included in both of said pair of channels includes
said crystal controlled oscillator, and
said voltage controlled oscillator; and
said phase control means includes
said phase comparison means responsive to said intermediate frequency signals at the output of each of said pair of said channels to produce a control signal proportional to the phase relationship between said intermediate frequency signals, and
first means coupled to said phase comparison means to couple said control signal to said crystal controlled oscillator and said voltage controlled oscillator of both said sources for phase adjustment of said local oscillator signal of both said sources in a push pull manner to vary the phase relation of said intermediate frequency of both said pairs of channels in a push pull manner to maintain said intermediate frequency signals of said pair of channels in a predetermined phase relationship.

6. A system according to claim 5, wherein
said first means includes
low pass filter means to couple said control signal to said crystal controlled oscillator of both said sources, and
high pass filter means to couple said control signal to said voltage controlled oscillator of both said sources.

7. A system according to claim 1, wherein
each of said sources include
said crystal controlled oscillator, and
said voltage controlled oscillator;
said means to combine includes
a conductor coupled to the output of each of said channels; and
said phase control means includes
a plurality of phase comparison means each coupled to the output of an associated one of said channels and said conductor to produce a control signal proportional to the phase relationship between the associated one of said intermediate frequency signals and the combined signal on said conductor, and
a first means coupled to each of said phase comparison means to couple each of said control signals to the associated one of said crystal controlled oscillator and said voltage controlled oscillator for phase adjustment of the associated one of said local oscillator signals to vary the phase relation of said intermediate frequency signals to maintain said intermediate frequency signals in a predetermined phase relationship.

8. A system according to claim 7, wherein
said means to combine further includes
an isolation means coupled between the output of each of said channels and said conductor.

9. A system according to claim 7, wherein
each of said first means includes
low pass filter means to couple said control signal to the associated one of said crystal controlled oscillators, and
high pass filter means to couple said control signal to the associated one of said voltage controlled oscillators.

10. A system according to claim 9, wherein
said means to combine further includes
an isolation means coupled between the output of each of said channels and said conductors.

References Cited

UNITED STATES PATENTS

| | | |
|---|---|---|
| 2,249,425 | 7/1941 | Hansell. |
| 3,195,049 | 7/1965 | Altman et al. |

KATHLEEN H. CLAFFY, *Primary Examiner.*

C. JIRAUCH, *Assistant Examiner.*

U.S. Cl. X.R.

325—305, 369